No. 826,966. PATENTED JULY 24, 1906.
J. SCHNEIBLE.
COOLER OR CONDENSER.
APPLICATION FILED MAY 4, 1905.

Attest:
Edgworth Greene
A. N. Jesbera

Inventor:
Joseph Schneible
by Redding, Kiddle & Greeley
Attys.

UNITED STATES PATENT OFFICE.

JOSEPH SCHNEIBLE, OF WEEHAWKEN, NEW JERSEY.

COOLER OR CONDENSER.

No. 826,966.  Specification of Letters Patent.  Patented July 24, 1906.

Application filed May 4, 1905. Serial No. 258,761.

*To all whom it may concern:*

Be it known that I, JOSEPH SCHNEIBLE, a citizen of the United States, residing in Weehawken, in the county of Hudson, in the State of New Jersey, have invented certain new and useful Improvements in Coolers or Condensers, of which the following is a specification, reference being had to the accompanying drawings, forming a part hereof.

This invention relates to coolers or condensers of the general type shown in Letters Patent of the United States, No. 710,810, dated October 7, 1902. In the practical use of such coolers or condensers the outer and inner pipes are subjected to widely-varying degrees of temperature, and therefore expand and contract unequally. Such expansion and contraction render it necessary to provide special means for preventing leakage at the joints. This is easily accomplished between the headers and the pipes, but is less easily accomplished as to the joints between the inner pipes and the return-bends. It has been sought to accomplish the desired object by providing elastic packing between the ends of the pipes and the bends, the latter being rigidly secured to the headers; but it is found in practice that such elastic packing is quickly cut to pieces and ceases to accomplish its purpose. It has also been sought to provide an expansion-joint between the end of each inner pipe and the corresponding end of the return-bend; but as such return-bends are frequently detached in order to permit the cleansing of the interior of the inner pipes such expansion-joint also quickly ceases to accomplish its intended purpose. In the present case these difficulties have been completely overcome and leakage at these joints wholly prevented even when the apparatus is subjected to extraordinary conditions, such as the immediate change from liquid nearly at the boiling-point to liquid nearly at the freezing-point, by securing the bends to the headers in a yielding manner, so that they shall move with the ends of the inner pipes as the same expand and contract and providing between the end of each pipe and the corresponding end of the bend an ordinary packing which maintains a tight joint under all conditions and does not suffer in the detachment and reattachment of the bends.

The invention will be more fully explained hereinafter with reference to the accompanying drawings, in which it is illustrated.

Figure 1:
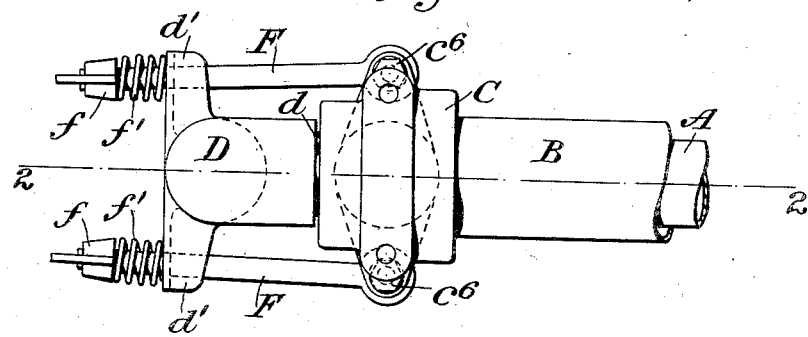
Figure 2:
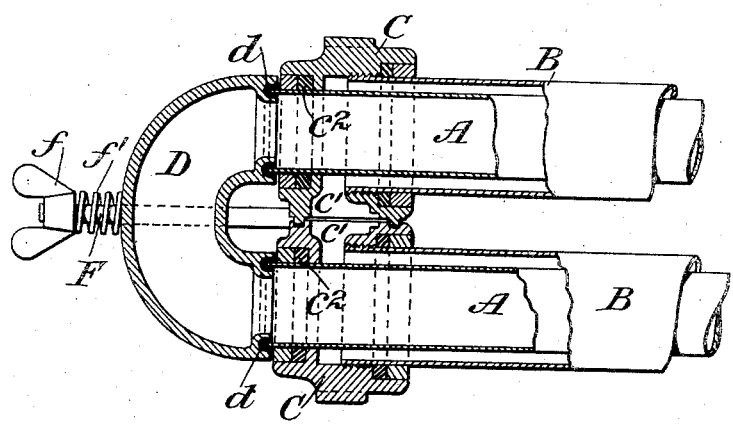
Figure 3:
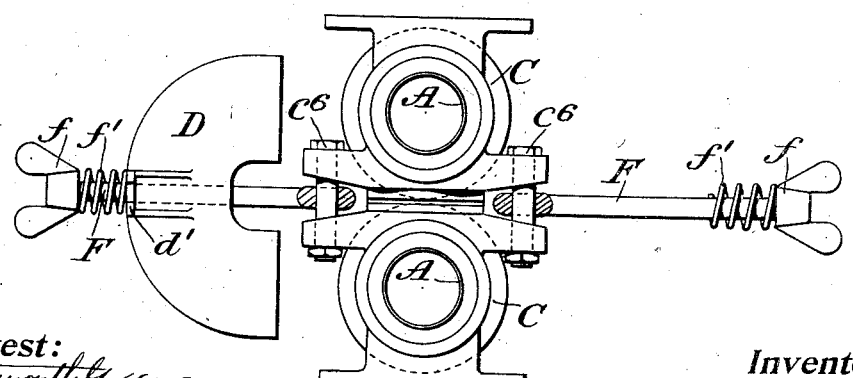

In said drawing, Figure 1 is a top view of a sufficient portion of such a cooler or condenser as is shown in said Letters Patent No. 710,810 to enable the application of the present improvement to be understood. Fig. 2 is a view, partly in vertical section, on the plane indicated by the line 2 2 of Fig. 1 and partly in side elevation. Fig. 3 is a view in end elevation, showing the bend swung away from the ends of the pipes.

As shown in the construction shown and described in said Letters Patent No. 710,810, the cooler or condenser is made up of as many sets of pipes for the liquid to be cooled and pipes for the brine or ammonia or other refrigerant as may be necessary to produce the desired result. The liquid to be cooled or the vapor to be condensed, or, it might be, the liquid to be heated, if the apparatus be used for such purpose, is preferably carried in the pipes A, arranged centrally within the pipes B, which conduct the cooling or heating medium. Both the inner pipes and the outer pipes are supported by coupling-pieces or headers C, the pipes B being preferably threaded therein with a tight joint and the pipes A, which project beyond the pipes B, having, preferably, a leaded joint, as at $c^2$, which will permit expansion and contraction of the pipes A with respect to the couplings or headers C. Each coupling-piece or header C is secured to the coupling-piece above or below it, as by bolts $c^6$, each coupling-piece or header being chambered, as at $c'$, and communicating with the coupling above or below it, as the case may be, so that a continuous conductor is provided for the cooling or heating medium through the pipes B from one end of the cooler to the other. The inner pipes A are also connected in pairs at opposite ends of the structure in order to provide a continuous passage for the liquid or vapor to be heated or cooled from one end of the cooler to the other, and for this purpose bends D are provided, each bend being formed with seats, as at $d$, and suitable packing to make tight joints with the ends of the corresponding pipes A.

Since it is necessary to provide ready access to the interior of the pipes A to enable them to be cleaned from time to time, the bends D should be readily detachable from the ends of the pipes A. They must also be held closely against the ends of such pipes in order to make tight joints, and provision must be made to accommodate the expansion and contraction of the pipes A, although the bends are supported by the couplings or headers C. As hereinbefore stated, it has been proposed to make the packing D sufficiently elastic to compensate for the expansion and contraction of the pipes while the bends are held rigidly to the couplings or headers, and it has also been proposed to permit the bends to fit over the ends of the pipes, provision being made for expansion-joints between the bends and the pipes in order to accommodate the expansion and contraction of the pipes. Both of these devices, however, have proved unsatisfactory in practice, because after a comparatively short use they permit leakage at the joints. In the present instance the packing at the joint $d$ is of ordinary character and permits a tight joint to be maintained under all conditions. The bend D, however, is held yieldingly with respect to the supporting header or coupling, but tightly against the ends of the pipes A, so that each bend instead of being rigidly fixed with respect to the header or coupling is permitted to move with respect thereto as the pipes A expand or contract. Accordingly springs $f'$ are provided between the thumb-nuts $f$ on the link-bolts F and the slotted lugs $d'$ formed on the bends D to receive the link-bolts. The latter may be pivoted upon the bolts $c^6$ to permit the easy detachment of the bends. The springs $f'$ are sufficiently stiff to permit the bends to be held against the ends of the pipes A with such pressure as to prevent leakage at the joints $d$, and yet they yield sufficiently to permit the bends to accommodate themselves to the expansion and contraction of the pipes A without disturbing the joint $d$. With this improvement the leaking of the joints in the old constructions referred to is wholly overcome, and the joints $d$ remain tight under all conditions even when the structure is subjected to sudden and excessive changes of temperature, so that the shifting of the pipes A with respect to the headers or couplings $c$ is considerable.

I claim as my invention—

1. In a cooler or condenser, the combination of a support, pipes so mounted in the support so as to be capable of endwise movement therein, a bend connecting one pipe with another and means to hold said bends detachably against said pipes and yieldingly with respect to said support whereby said bend may move with the ends of said pipes in their movement relative to the support, substantially as described.

2. In a cooler or condenser, the combination of a support, pipes so mounted in the support as to be capable of endwise movement therein, a detachable bend connecting the end of one pipe with another, means for detachably securing said bend to said support against the ends of said pipes, said means including springs to permit the bend to move with the ends of said pipes in their movement relative to the support, substantially as described.

This specification signed and witnessed this 25th day of April, 1905.

JOSEPH SCHNEIBLE.

In presence of—
ANTHONY N. JESBERA,
M. A. BRAYLEY.